Oct. 13, 1925.

Re. 16,186

W. D'A. RYAN

VEHICLE LAMP

Original Filed Nov. 28, 1923

Inventor
Walter D'Arcy Ryan,
By Earl H. Pierce
Atty.

Reissued Oct. 13, 1925.

Re. 16,186

UNITED STATES PATENT OFFICE.

WALTER D'ARCY RYAN, OF SCHENECTADY, NEW YORK.

VEHICLE LAMP.

Original No. 1,484,209, dated February 19, 1924, Serial No. 677,404, filed November 28, 1923. Application for reissue filed September 5, 1924. Serial No. 736,175.

*To all whom it may concern:*

Be it known that I, WALTER D'ARCY RYAN, a citizen of the United States, residing at Schenectady, in the county of Schenectady and State of New York, have invented certain new and useful Improvements in Vehicle Lamps, of which the following is a specification.

My invention relates to the art of illumination, and particularly to vehicle headlights which are adapted adequately to light the roadway, and perform the additional function of illuminating the forward part of the vehicle and an area surrounding it.

One of the objects of my invention is to provide a headlight in which glare is eliminated, or at least reduced to such an extent as to be negligible.

Another object of my invention is to provide a headlight of the character described capable of projecting a highly satisfactory beam of light a long distance in advance of the vehicle.

A further object is to provide a headlight which will adequately illuminate the forward portions of the vehicle and the sides of the road, ditches, cross-roads, surrounding foliage, etc., as may be desired.

Another object of my invention is to provide a headlight of the character described above, in which all of the results referred to are accomplished by the use of a single source of light.

In addition, my invention contemplates the provision of a headlight which is simple in construction and inexpensive to manufacture.

The above, and other objects of my invention, will appear as this description progresses, reference being had to the accompanying drawings, in which—

Figure 1:
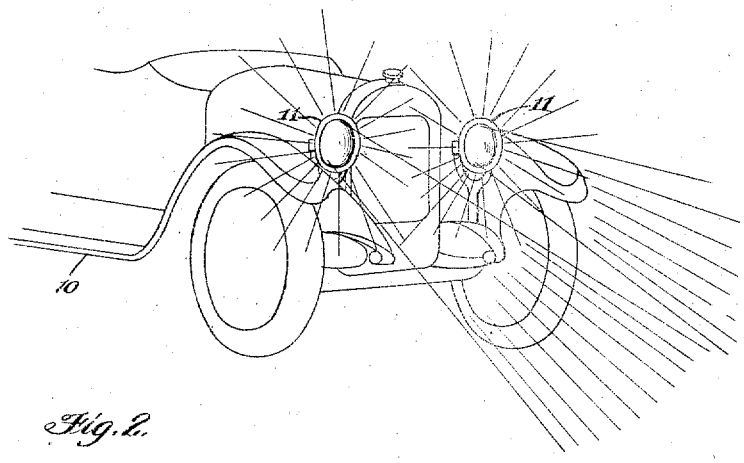
Figure 1 is a more or less diagrammatic view, illustrating in general the functioning of my device, indicating lines being inserted to show the distribution of the light rays.
Figure 2:
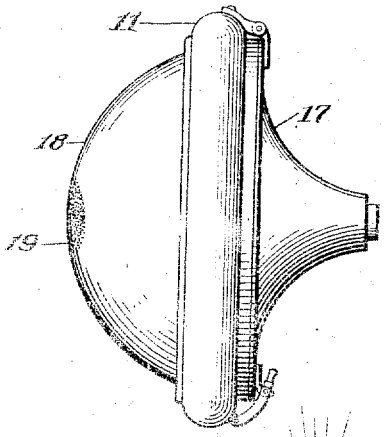
Figure 2 is a side elevation of the particular form of headlight I have chosen to illustrate.
Figure 3:
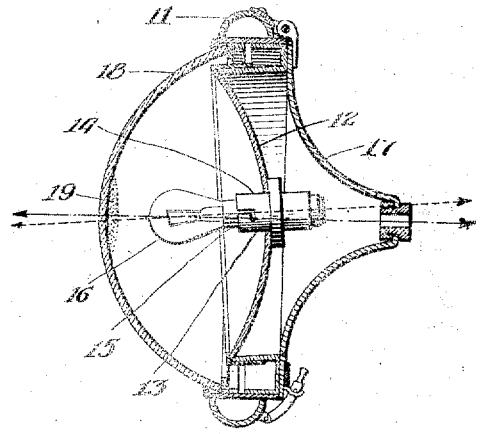
Figure 3 is a vertical sectional view thereof, with lines indicating the axis of the reflector and the housing.
Figure 4:
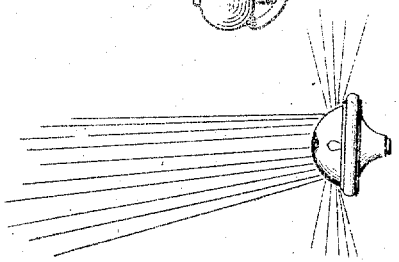
Figure 4 is a side elevation, on reduced scale, of the headlight, with lines indicating the paths taken by the reflected light rays and the direct light rays.

Referring to the accompanying drawings, the reference numeral 10 is used to indicate a vehicle (in this case an automobile) and the numeral 11 the housing of a headlight attached thereto. In the housing is mounted a shallow reflector 12, orificed centrally at 13 to permit of the passage therethrough of a lamp socket 14 to receive the base 15 of the lamp 16. I prefer to use a glass parabolic reflector, or its equivalent, a Mangin lens, on account of its specular qualities, although metal reflectors, under certain conditions, may be advantageously used.

The reflector 12 is secured in the housing with its periphery in close proximity to the plane of the edge of the housing. The lower side of the reflector is positioned slightly inside the plane of the edge of the housing, but the reflector is tilted slightly forward, so that its upper side lies slightly outside the plane of the edge of the housing. The reflector is of a shallow type and the lamp 16 is positioned in the socket 14 so that the filament thereof lies outwardly beyond the plane of the edge of the housing. A door 17 is secured to the housing in any practical or satisfactory manner and a lens or light emitting closure 18 is secured therein, said lens bulging outwardly, as shown, to inclose the projecting lamp 16. The central portion of the lens or light emitting closure 18 may be provided with diffusion means 19, if desired, to conceal the filament from direct view and to diffuse some of the forwardly directed rays.

The formation of the reflector, its position, and its relation to the lamp, constitute the very essence of my invention. The reflector is, as stated, of shallow type, with a long focal length, and the light source is substantially at the focal point of the reflector, the latter having its axis inclined to cause the beam to issue forwardly and slightly downwardly. This has the effect of projecting a beam a long distance forwardly on the roadway and yet it is inclined downwardly below the plane of the eye of an approaching driver, or pedestrian. With a reflector of a long focal length, the entire effective specular area is utilized and its focal point can be located in a plane beyond the plane of the edge of the casing, thereby permitting a portion of the direct rays to issue rearwardly, radially, and forwardly from the casing closure.

In addition to this, the central portion of the lens or light emitting closure is provided with diffusion means, if desired, that shields the eye of an approaching person from the light source.

By this construction it will be apparent that the beam of light for illuminating the roadway will be projected from a well lighted area so as to reduce the intense or glaring effect that is produced where the illuminating beam is projected from an unlighted area, and that the forward portion of the vehicle itself, and the space surrounding the forward portion of the vehicle, is adequately illuminated.

While I have described the details of construction of my invention, it is to be clearly understood that my invention is not limited to these details of construcion, but is capable of other adaptations and modifications within the scope of the appended claims.

Having thus described my invention, what I desire to secure by Letters Patent of the United States is:

1. A vehicle lamp comprising a housing, a shallow reflector with a long focal length secured therein, its axis being inclined slightly downwardly from the axis of the housing, a light source mounted substantially at the focal point of the reflector, an outwardly projecting light emitting closure to inclose the light source, the relative positioning of the reflector, housing and light source being such that the light source is in advance of the housing and a concentrated beam is projected forwardly and slightly downwardly therefrom and direct rays are released to illuminate an area forwardly and rearwardly therefrom.

2. A vehicle lamp comprising a housing, a reflector of a long focal length secured therein, the axis of said reflector being slightly inclined, a light source mounted in the axis of the reflector and projecting beyond the forward periphery of the housing, and an outwardly projecting light emitting closure inclosing the light source, so that a concentrated beam of light is projected forwardly and slightly downwardly, and direct rays from the source issue forwardly, upwardly, downwardly, laterally and slightly rearwardly.

3. A vehicle lamp comprising a housing, a shallow reflector with a long focal length secured therein, its axis being inclined slightly downwardly from the substantial horizontal axis of the housing, a light source mounted substantially near the focus of the reflector, an outwardly projecting light emitting closure to inclose the light source, the relative positioning of the reflector and light source in the housing being such that the light source projects beyond the forward periphery of the housing.

4. A construction as defined in claim 1 in which the light emitting closure is provided with a central diffusing area.

5. A headlight comprising a concave reflector, the focus of which lies outside the plane of the edge of said reflector, a single source of light located substantially at said focus, and an outwardly bulging transparent closure for said reflector having its margin extending at a substantial angle to the lateral rays of said light source, said source of light being positioned within said closure, whereby a forwardly directed beam is produced and direct illumination laterally of the headlight is obtained.

6. A headlight comprising a shallow concave reflector, a single source of light lying outside of the plane of the edge of said reflector and located substantially in the focus of the latter, and a transparent closure for said reflector having marginal portions extending at an angle to said plane, the axis of said reflector being inclined to the horizontal, whereby a forwardly directed beam is produced and direct illumination laterally of the headlight is obtained.

7. A headlight comprising a reflector, a single source of light positioned in advance of the plane of the edge of the reflector and located substantially in the focus of the latter to produce a forwardly directed, reflected beam and lateral illumination substantially at right angles to said reflected beam, the axis of said reflector being tilted for depressing the beam to avoid glare, and a transparent, bulging closure for said reflector having marginal portions extending at a substantial angle to the lateral rays from the light source so as to permit said lateral illumination, a portion of the rim of said reflector lying in the rear of the plane of the edge of the reflector.

8. A headlight for motor vehicles comprising a source of light, a transparent outwardly bulging closure receiving substantially all the laterally emitted light from said source and transmitting it in a direction substantially at right angles to the axis of the headlight, and a shallow, concave reflector positioned in relation to the source of light so as to reflect a concentrated beam of light through said closure in a forward direction, said closure being positioned in advance of said reflector and having its marginal portion facing the filament of said source of light.

In witness whereof, I hereunto subscribe my name, this 3rd day of September, 1924.

WALTER D'ARCY RYAN.